United States Patent
Hattori et al.

(10) Patent No.: US 10,946,726 B2
(45) Date of Patent: Mar. 16, 2021

(54) AIR CONDITIONING SYSTEM, VEHICLE, CONTROL DEVICE, AND CONTROL METHOD

(71) Applicant: TAIYO YUDEN CO., LTD., Tokyo (JP)

(72) Inventors: Masashi Hattori, Takasaki (JP); Yosuke Onda, Takasaki (JP); Kenichi Shimomai, Takasaki (JP); Jin Mikata, Takasaki (JP); Taiji Ito, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 163 days.

(21) Appl. No.: 16/226,338

(22) Filed: Dec. 19, 2018

(65) Prior Publication Data
US 2019/0193528 A1 Jun. 27, 2019

(30) Foreign Application Priority Data
Dec. 22, 2017 (JP) .............................. JP2017-247052

(51) Int. Cl.
*B60H 3/00* (2006.01)
*B60H 3/06* (2006.01)
*B60H 1/00* (2006.01)

(52) U.S. Cl.
CPC .............. *B60H 3/0085* (2013.01); *B60H 3/06* (2013.01); *B60H 1/00742* (2013.01); *B60H 1/00821* (2013.01)

(58) Field of Classification Search
CPC .... B60H 3/0085; B60H 3/06; B60H 1/00821; B60H 1/00742; B60H 1/008
See application file for complete search history.

(56) References Cited

U.S. PATENT DOCUMENTS

| | | | |
|---|---|---|---|
| 2014/0262132 A1* | 9/2014 | Connell | B60H 1/008 165/11.1 |
| 2016/0176261 A1* | 6/2016 | Khorana | B60H 1/00821 165/248 |
| 2018/0244128 A1* | 8/2018 | Beloe | B60H 1/241 |

FOREIGN PATENT DOCUMENTS

| | | |
|---|---|---|
| JP | H0435715 A | 2/1992 |
| JP | H10329537 A | 12/1998 |

(Continued)

OTHER PUBLICATIONS

An Information Statement filed by a third-party filed to the Japanese Patent Office on Nov. 1, 2019, for Japanese counterpart application No. 2017-247052. (1 page).

*Primary Examiner* — Marthe Y Marc-Coleman
(74) *Attorney, Agent, or Firm* — Law Office of Katsuhiro Arai (57) ABSTRACT

An air conditioning system includes: an air conditioner to regulate a state of air in a room; a sensor device including at least one detector to detect an amount of an odor-causing substance included in the air in the room; and a control device to control operation of the air conditioner. The control device includes: a first acquisition unit to acquire a detected value of each of the at least one detector at a first timing when a person is present in the room; a second acquisition unit to acquire a detected value of each of the at least one detector at a second timing later than the first timing; a difference calculator to calculate a difference between the detected value at the first timing and the detected value at the second timing; and an instruction unit to control operation of the air conditioner based on the difference.

13 Claims, 9 Drawing Sheets

(56) References Cited

FOREIGN PATENT DOCUMENTS

| JP | H11156131 A | 6/1999 | |
|---|---|---|---|
| JP | 2000210518 A | 8/2000 | |
| JP | 2012072946 A | 4/2012 | |
| JP | 2016199098 A | 12/2016 | |
| WO | WO-2017104927 A1 * | 6/2017 | ........... B60H 3/0085 |

* cited by examiner

AIR CONDITIONING SYSTEM, VEHICLE, CONTROL DEVICE, AND CONTROL METHOD

CROSS-REFERENCE TO RELATED APPLICATIONS

This application is based upon and claims the benefit of priority from Japanese Patent Application No. 2017-247052, filed Dec. 22, 2017, the entire contents of which are incorporated herein by reference.

FIELD

Embodiments described herein relate generally to an air conditioning system, a vehicle, a control device, and a control method.

BACKGROUND

Odor sensors have been widely developed. For example, a quartz crystal microbalance (QCM) sensor is known as an odor sensor, which has a film that absorbs odor-causing substances on a surface of a crystal resonator. The resonance frequency of the AT-cut crystal resonator changes with a mass variation. The QCM sensor detects the mass of a causative substance by causing the AT-cut crystal resonator to oscillate and detect the amount of change in resonance frequency.

A sensor device is also known, which includes a plurality of odor sensors individually detecting the masses of different causative substances. Such a sensor device can output respective masses of causative substances. An information processing apparatus receives the respective amounts of causative substances output from such a sensor device and compares a pattern of the received respective amounts of causative substances with a pattern registered in advance. The information processing apparatus thus can identify the kind of odor.

For example, the information processing apparatus can use such a sensor device to distinguish between unpleasant smells and pleasant smells, control odors in a room, control factory processes, or keep physical conditions using a body odor or a breath odor.

Japanese Patent Application Laid-open No. H11-156131 and Japanese Patent Application Laid-open No. 2000-210518 describe techniques for indicating the timing to replace a filter of an air purifier. Japanese Patent Application Laid-open No. H4-35715 describes a technique for controlling the opening/closing of an intake cover in accordance with a detection result by a contamination detecting sensor. Japanese Patent Application Laid-open No. 2016-199098 describes a technique for controlling the environment in a vehicle depending on odors in the vehicle.

The space in a vehicle is extremely narrow and closed. The driver/passenger in the vehicle is therefore very sensitive to an unusual smell and has to frequently control the operation of the air conditioner or open a window for ventilation. However, frequently operating the air conditioner or opening a window is burdensome for the driver/passenger. The environment in the vehicle may be deteriorated unless the air conditioner is stopped or the window is closed at an appropriate timing.

The present invention is made in view of the foregoing and aims to provide an air conditioning system, a vehicle, a control device, and a control method capable of reducing an unusual smell in the room with fewer burdens.

SUMMARY

According to an aspect of the present invention, an air conditioning system includes an air conditioner, a sensor device, and a control device. The air conditioner regulates a state of air in a room. The sensor device includes at least one detector to detect an amount of an odor-causing substance included in the air in the room. The control device controls operation of the air conditioner. The control device includes a first acquisition unit, a second acquisition unit, a difference calculator, and an instruction unit. The first acquisition unit acquires, from the sensor device, a detected value of each of the at least one detector at a first timing when a person is present in the room. The second acquisition unit acquires, from the sensor device, a detected value of each of the at least one detector at a second timing later than the first timing. The difference calculator calculates a difference between the detected value of each of the at least one detector at the first timing and the detected value of each of the at least one detector at the second timing. The instruction unit controls operation of the air conditioner based on the difference.

DETAILED DESCRIPTION

An air conditioning system 10 according to the present embodiment will be described below with reference to the drawings.

Figure 1:
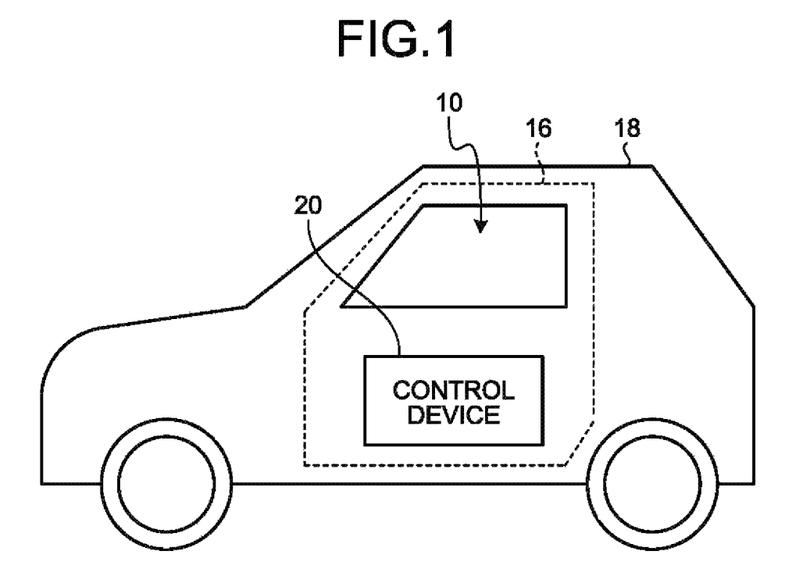
FIG. 1 is a diagram illustrating a vehicle.

FIG. 1 is a diagram illustrating the air conditioning system 10 according to an embodiment. In the present embodiment, the air conditioning system 10 is applied to a vehicle 18. The air conditioning system 10 applied to the vehicle 18 regulates a state of air in the interior space of the vehicle 18 (inside the vehicle). The air conditioning system 10 may be applied not only to the vehicle 18 but also to other devices that can regulate a state of air in a room 16 with a control device 20.

Figure 2:
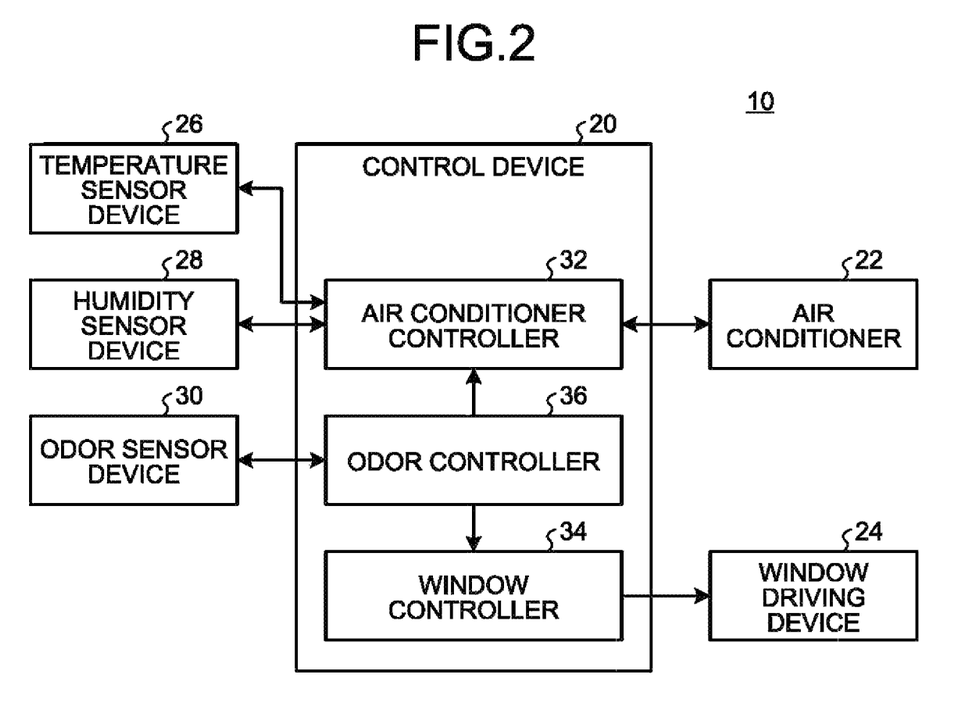
FIG. 2 is a diagram illustrating a configuration of an air conditioning system according to an embodiment.

FIG. 2 is a diagram illustrating a configuration of the air conditioning system 10 according to an embodiment.

The air conditioning system 10 includes a control device 20, an air conditioner 22, a window driving device 24, a temperature sensor device 26, a humidity sensor device 28, and an odor sensor device 30.

The control device 20 is a dedicated or general-purpose computer. The control device 20 electronically controls functions of the vehicle 18. The control device 20 may operate in cooperation with another information processing apparatus external to the vehicle 18.

The air conditioner 22 controls a state of air in the room 16 that is the interior space of the vehicle 18 (inside the vehicle). For example, the air conditioner 22 can regulate the temperature and the humidity of the air in the room 16 by warming the room 16 (heater) or cooling the room 16 (cooler).

The air conditioner 22 can ventilate the room 16. More specifically, the air conditioner 22 can take the air outside the room 16 into the room 16 and exhaust the air in the room 16 to the outside. In addition, the air conditioner 22 can clean the air in the room 16. More specifically, the air conditioner 22 can remove minute substances (dust, etc.) included in the air in the room 16.

The window driving device 24 opens/closes a window of the vehicle 18. For example, the window driving device 24 can open the window or close the window in accordance with an instruction from a driver/passenger.

The temperature sensor device 26 measures the temperature of the air in the room 16. The temperature sensor device 26 then transmits a signal indicating the measurement result to the control device 20.

The humidity sensor device 28 measures the humidity of the air in the room 16. The humidity sensor device 28 then transmits a signal indicating the measurement result to the control device 20.

The odor sensor device 30 includes at least one detector. Each of at least one detector included in the odor sensor device 30 detects the amount of an odor-causing substance included in the air in the room 16 to make people perceive a smell. In the present embodiment, the detector detects the mass of a causative substance as the amount of a causative substance. Instead, the detector may detect the volume or molecular weight of a causative substance as the amount of a causative substance. The odor sensor device 30 transmits a signal indicating the detected value of each of at least one detector to the control device 20.

The control device 20 includes an air conditioner controller 32, a window controller 34, and an odor controller 36. The control device 20, for example, includes a processor to execute a dedicated program. The processor thus functions as the air conditioner controller 32, the window controller 34, and the odor controller 36.

The air conditioner controller 32 controls the operation of the air conditioner 22 in accordance with an operation by the driver/passenger. The air conditioner controller 32 may control the operation of the air conditioner 22 in accordance with the temperature measured by the temperature sensor device 26 and the humidity measured by the humidity sensor device 28, such that the air in the room 16 is kept at the specified temperature and humidity.

The window controller 34 gives a control instruction to the window driving device 24 in accordance with an instruction from the driver/passenger. For example, the window controller 34 gives an instruction to the window driving device 24 to open the window and causes the window driving device 24 to open the window. For example, the window controller 34 gives an instruction to the window driving device 24 to close the window and causes the window driving device 24 to close the window.

The odor controller 36 acquires the detected value of each of at least one detector from the odor sensor device 30. The odor controller 36 determines an odor of the air in the room 16, based on the detected value of each of at least one detector. Specifically, the odor controller 36 determines the kind and the intensity of an odor of the air in the room 16. The odor controller 36 then regulates a state of the air in the room 16 based on the determination result. For example, the odor controller 36 gives an instruction to the air conditioner controller 32 and the window controller 34 to operate the air conditioner 22 or open/close the window.

Figure 3:
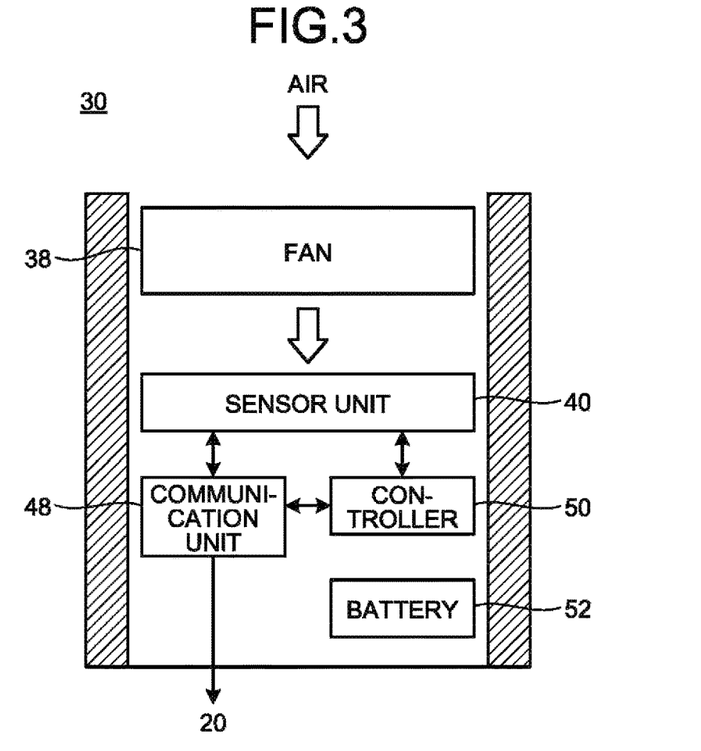
FIG. 3 is a diagram illustrating a configuration of an odor sensor device.

FIG. 3 is a diagram illustrating a configuration of the odor sensor device 30. The odor sensor device 30 is sized, for example, such that it can be carried with one hand. For example, the odor sensor device 30 is stored in a casing having a size of about a few mm to a few cm per side.

The odor sensor device 30 has a fan 38, a sensor unit 40, a communication unit 48, a controller 50, and a battery 52.

The fan 38 takes in the external air and supplies the taken air to the sensor unit 40. For example, the fan 38 is disposed between an intake and the sensor unit 40 and feeds the external air from the intake to the sensor unit 40. The odor sensor device 30 is disposed in the vehicle 18 such that the intake can take in the air in the room 16. Therefore, the fan 38 can take in the air in the room 16 and supply the air to the sensor unit 40.

The sensor unit 40 includes at least one detector described above. The detector detects the amount of an odor-causing substance included in the air blown from the fan 38. The sensor unit 40 then outputs a signal indicating the detected value of each of at least one detector.

When the sensor unit 40 includes a plurality of detectors, the detectors are devices of different kinds.

For example, any two detectors included in the sensor unit 40 detect the amount of odor-causing substances of different kinds. For example, a first detector detects the amount of a substance X, and a second detector detects the amount of a substance Y. For example, any two detectors included in the sensor unit 40 may detect the amount of an odor-causing substance of the same kind at different sensitivities. For example, a first detector detects the amount of a substance X at a first sensitivity, and a second detector detects the amount of the substance X at a second sensitivity lower than the first sensitivity.

For example, any two detectors included in the sensor unit 40 may detect the amounts of different combinations of a plurality of odor-causing substances. For example, a first detector detects the total amount of a substance X and a substance Y, and a second detector detects the total amount of the substance X and a substance Z. For example, any two detectors included in the sensor unit 40 may detect the amount of the same combination of odor-causing substances at different sensitivities. For example, a first detector may detect the total amount of a substance X and a substance Y at a first sensitivity, and a second detector may detect the total amount of the substance X and the substance Y at a second sensitivity lower than the first sensitivity.

The communication unit 48 transmits a signal output from the sensor unit 40 to the control device 20. The controller 50 manages and controls the operation of the fan 38, the sensor unit 40, and the communication unit 48. For example, the controller 50 controls the operation start timing and the operation end timing of the fan 38.

The battery 52 supplies operating electric power to the fan 38, the sensor unit 40, the communication unit 48, and the controller 50. The odor sensor device 30 may have a power acquisition unit to acquire a power supply in the vehicle 18, instead of the battery 52. The power acquisition unit supplies operating electric power to the fan 38, the communication unit 48, and the controller 50.

Figure 4:
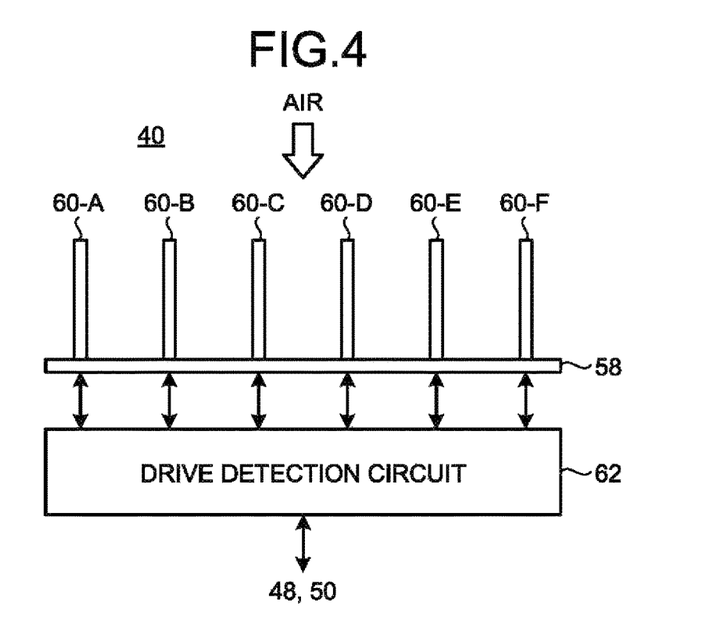
FIG. 4 is a diagram illustrating a configuration of a sensor unit.

FIG. 4 is a diagram illustrating a configuration of the sensor unit 40. In the present embodiment, the sensor unit 40 is a QCM sensor capable of detecting the mass of a minute substance included in the air. The sensor unit 40 may not be a QCM sensor and may be other types of sensors, such as a gas sensor with a semiconductor thin film.

In the present embodiment, the sensor unit 40 includes a support 58, at least one gas detector 60, and a drive detection circuit 62. At least one gas detector 60 is attached to the support 58.

The gas detector 60 is an example of the detector. In the example in FIG. 3, the sensor unit 40 has six gas detectors 60-A to 60-F of different kinds. For example, six gas detectors 60-A to 60-F individually detect different kinds of odor-causing substances.

Each of at least one gas detector 60 includes a crystal resonator capable of oscillating by the piezoelectric effect, two electrodes provided on flat surfaces on both sides of the crystal resonator, and an adsorption film provided on at least one of the flat surfaces of the crystal resonator.

The crystal resonator has a side surface partially held on the support 58 so as to oscillate. An alternating-current (AC) voltage is applied to the two electrodes from the drive detection circuit 62. The adsorption film adsorbs a certain causative substance included in the ambient air. Each of at least one gas detector 60 includes an adsorption film that adsorbs a different substance. Specifically, each of at least one gas detector 60 includes an adsorption film that adsorbs a causative substance to be detected by the odor sensor device 30.

In such a gas detector 60, when an AC voltage at a resonance frequency is applied to the two electrodes, the crystal resonator oscillates by the piezoelectric effect. The fundamental resonance frequency of the crystal resonator is determined by mass and viscoelasticity. Therefore, when the adsorption film adsorbs a causative substance and its mass changes, the fundamental resonance frequency of the gas detector 60 changes with the change of the mass adsorbed.

When the fan 38 blows the air, the drive detection circuit 62 applies an AC voltage to each of at least one gas detector 60 and detects a change in fundamental resonance frequency of each of at least one gas detector 60. The drive detection circuit 62 thus can detect the mass of an odor-causing substance included in the air blown by the fan 38, for each of at least one gas detector 60. The drive detection circuit 62 applies the detected value to the communication unit 48.

Figure 5:
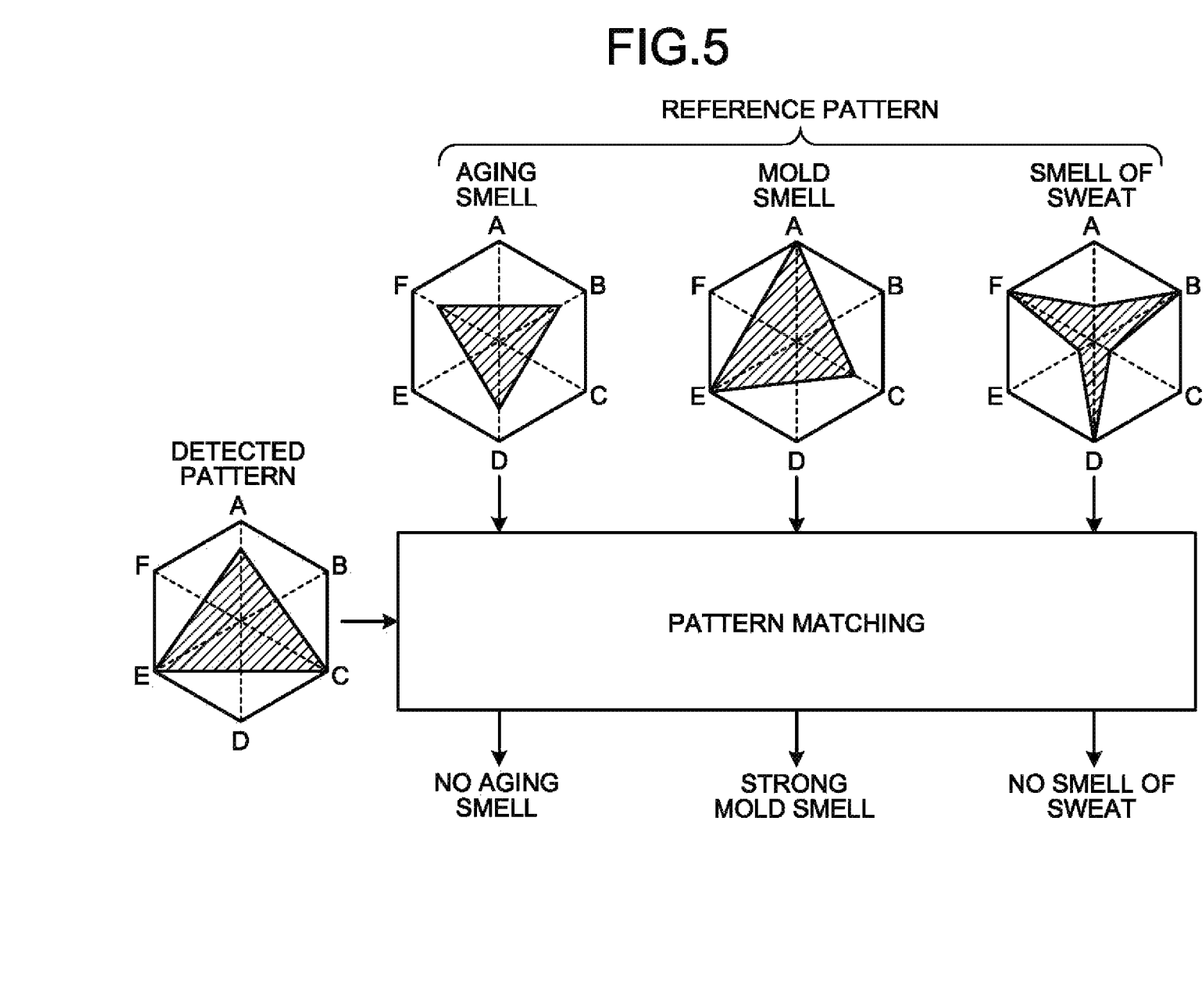
FIG. 5 is a diagram for explaining an odor determination process.

FIG. 5 is a diagram for explaining an odor determination process.

The control device 20 acquires a signal indicating the detected value of each of at least one detector from the odor sensor device 30. For example, in the example in FIG. 5, the control device 20 acquires signals indicating respective detected values of the gas detector 60-A, the gas detector 60-B, the gas detector 60-C, the gas detector 60-D, the gas detector 60-E, and the gas detector 60-F.

The control device 20 stores a reference pattern indicating the detected value of each of at least one detector indicating the amount of an odor-causing substance included in the air having a predetermined kind of odor. For example, in the example in FIG. 5, the control device 20 stores a reference pattern indicating the detected values of the gas detectors 60-A to 60-F when an aging smell, a mold smell, and a smell of sweat are each detected.

The control device 20 matches a detected pattern indicating the detected value of each of at least one detector that is included in the signal acquired from the odor sensor device 30 with a reference pattern indicating the detected value of each of at least one detector when a predetermined kind of odor stored in advance occurs. Then, if the detected pattern acquired from the odor sensor device 30 matches the reference pattern, the control device 20 determines that the odor of the air applied to the odor sensor device 30 is a predetermined kind of odor. Reference patterns of different kinds of odors may be stored in advance so that the control device 20 determines which reference pattern of odor is matched with the detected pattern. For example, in the example in FIG. 5, the control device 20 determines that the odor of the air applied to the odor sensor device 30 is a mold smell.

The control device 20 may further determine, for each kind of odor, the intensity of the odor by matching. For example, a reference pattern may be stored for each kind of odor and each level of intensity of the odor so that the control device 20 matches the detected pattern acquired from the odor sensor device 30 with a reference pattern stored in advance for each kind of odor and each level of intensity of the odor.

Alternatively, the control device 20 may update a reference pattern stored in advance by learning, using the detected pattern obtained when the user perceives that a predetermined kind of odor occurs, as teaching data. The control device 20 may periodically acquire a reference pattern for each of different kinds of odors and for each level of intensity of the odor, for example, from a server to update the stored reference pattern.

The control device 20 may determine the kind and the intensity of an odor by any other method instead of such pattern matching. For example, the control device 20 may determine the kind of odor and the intensity of the odor using techniques such as neural network.

In the example in FIG. 5, the odor sensor device 30 outputs the detected values of six gas detectors 60-A to 60-F. However, the odor sensor device 30 may output the detected values of less than six or more than six detectors. In the example in FIG. 5, an aging smell, a mold smell, and a smell of sweat are determined. However, the control device 20 may determine any other odors. The odor sensor device 30 in the present embodiment may output a detected value of one detector.

Here, the control device 20 gives a detection instruction to the odor sensor device 30 at a first timing when a person is present in the room 16. In response to reception of the detection instruction, the odor sensor device 30 detects the amount of an odor-causing substance at the first timing using each of at least one detector. The odor sensor device 30 then transmits a signal indicating the detected value of each of at least one detector at the first timing to the control device 20.

Further, the control device 20 gives a detection instruction to the odor sensor device 30 at a second timing later than the first timing. For example, the control device 20 gives a detection instruction to the odor sensor device 30 at predetermined time intervals after the first timing. In response to reception of the detection instruction, the odor sensor device 30 detects the amount of an odor-causing substance at the second timing, using each of at least one detector. The odor sensor device 30 then transmits a signal indicating the detected value of each of at least one detector at the second timing to the control device 20.

Figure 6:
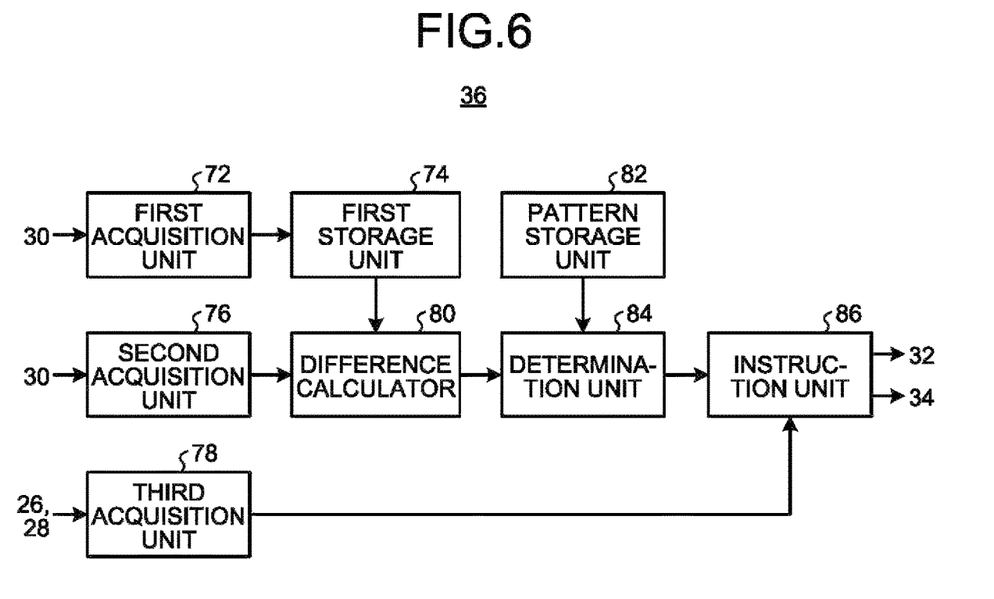
FIG. 6 is a diagram illustrating a functional configuration of an odor controller according to an embodiment.

FIG. 6 is a diagram illustrating a functional configuration of the odor controller 36 according to an embodiment. The odor controller 36 includes a first acquisition unit 72, a first storage unit 74, a second acquisition unit 76, a third acquisition unit 78, a difference calculator 80, a pattern storage unit 82, a determination unit 84, and an instruction unit 86.

The first acquisition unit 72 gives a detection instruction to the odor sensor device 30 at a first timing. The first acquisition unit 72 then acquires a signal indicating the detected value of each of at least one detector at the first timing from the odor sensor device 30. The first timing is any timing when a person (driver/passenger) is present in the room 16. The first timing is preferably a timing when a person in the room 16 does not perceive an unusual smell. For example, the first timing is a timing when the person starts the vehicle 18 using a key or a timing when the person holds the steering wheel. When a button indicating that air conditioning is not abnormal is provided in the vehicle 18, the first timing may be a timing when a driver/passenger presses such a button.

The first storage unit 74 stores the detected value of each of at least one detector at the first timing that is included in the signal acquired by the first acquisition unit 72.

The second acquisition unit 76 gives a detection instruction to the odor sensor device 30 at a second timing later than the first timing. The second acquisition unit 76 then acquires a signal indicating the detected value of each of at least one detector at the second timing from the odor sensor device 30. For example, the second timing may be a timing at predetermined intervals (for example, every few tens of seconds or every few minutes) after the first timing. The first acquisition unit 72 and the second acquisition unit 76 may be implemented by common hardware or may be implemented by separate hardware.

The third acquisition unit 78 gives a detection instruction to the temperature sensor device 26. The third acquisition unit 78 then acquires a signal indicating the temperature of the air in the room 16 from the temperature sensor device 26. The third acquisition unit 78 also gives a detection instruction to the humidity sensor device 28. The third acquisition unit 78 then acquires a signal indicating the humidity of the air in the room 16 from the humidity sensor device 28.

The difference calculator 80 calculates a differential pattern every time the second acquisition unit 76 acquires a signal indicating the detected value of each of at least one detector, that is, every second timing. For example, the difference calculator 80 calculates a differential pattern at predetermined time intervals after the first timing. Specifically, the difference calculator 80 reads the detected value of each of at least one detector at the first timing from the first storage unit 74. The difference calculator 80 then calculates a differential pattern indicating the difference between a first pattern indicating the detected value of each of at least one detector at the first timing and a second pattern indicating the detected value of each of at least one detector at the second timing.

For example, the difference calculator 80 calculates a differential pattern by subtracting the first pattern from the second pattern. For example, the difference calculator 80 subtracts a value indicating the detected value of each of at least one detector that is included in the first pattern from a value of the corresponding detector indicating the detected value that is included in the second pattern. The differential pattern thus calculated indicates the detected value of each of at least one detector that changes between the first timing and the second timing. The difference calculator 80 applies the calculated differential pattern to the determination unit 84.

The pattern storage unit 82 stores one or more reference patterns in association with different kinds of odors and each level of intensity of the odor. The reference pattern indicates the detected value of each of at least one detector when the air with the corresponding odor is applied. More specifically, the reference pattern indicates a detected value output from each of at least one detector included in the odor sensor device 30 when the corresponding kind of odor and the corresponding intensity of the odor occur. For example, the pattern storage unit 82 stores a reference pattern indicating the detected value of each of at least one detector when an aging smell with a predetermined intensity, a mold smell with a predetermined intensity, and a smell of sweat with a predetermined intensity are each detected. The pattern storage unit 82 may store a pattern of an odor other than those kinds of odors.

The determination unit 84 matches the differential pattern with a plurality of reference patterns stored in the pattern storage unit 82. Then, if the differential pattern matches any one of the reference patterns, the determination unit 84 determines that the odor of the air in the room 16 is an odor of any one kind and intensity. More specifically, the determination unit 84 selects any one of one or more reference patterns that matches the differential pattern or falls within a predetermine range. The determination unit 84 then determines the odor is of the kind and with the intensity corresponding to the selected reference pattern.

It is noted that a match between patterns includes not only an exact match between two patterns but also a mismatch with a predetermined error or less or the closest reference pattern selected among a plurality of reference patterns. The determination unit 84 may determine the kind of odor and the intensity of the odor by a method other than such pattern matching. For example, the determination unit 84 may determine the kind of odor and the intensity of the odor that match the differential pattern, for example, using a neural network.

The instruction unit 86 receives a determination result from the determination unit 84. Then, if the determined intensity of the odor is greater than a predetermined first threshold, the instruction unit 86 gives an instruction to the air conditioner controller 32 to cause the air conditioner 22 to start ventilation or cleaning of the air in the room 16.

In this case, the instruction unit 86 may start ventilation or cleaning when the intensity of an odor of a certain kind is greater than a first threshold. Alternatively, the instruction unit 86 may start ventilation or cleaning when the intensity of any one of two or more kinds of odors is greater than a first threshold. Alternatively, the instruction unit 86 may start ventilation or cleaning when the intensities of odors of certain kinds of two or more kinds are greater than a first threshold. The first threshold may vary according to the kind of odor.

For example, when ventilation or cleaning of the air in the room 16 is performed by the air conditioner 22, the instruction unit 86 may cause the air conditioner 22 to perform ventilation or cleaning of the air in the room 16 while keeping the temperature of the air in the room 16 constant, based on the measurement result by the temperature sensor device 26. For example, when ventilation or cleaning of the air in the room 16 is performed, the instruction unit 86 may cause the air conditioner 22 to perform ventilation or cleaning of the air in the room 16 while keeping the humidity of the air in the room 16 constant, based on the measurement result by the humidity sensor device 28.

After ventilation or cleaning of the air in the room 16 by the air conditioner 22 is started, the instruction unit 86 causes the air conditioner 22 to stop ventilation or cleaning of the air in the room 16 if the determined intensity of the odor falls below a predetermined second threshold. The second threshold is, for example, lower than the first threshold by a predetermined value or more. This setting can eliminate frequent repetition of start and stop of ventilation or cleaning in the vicinity of the threshold. The second threshold may be equal to the first threshold or may be higher than the first threshold.

For example, the instruction unit 86 may ventilate the room 16 by giving an instruction to the window controller 34 to open the window, rather than ventilation of the room 16 by the air conditioner 22. When the room 16 is ventilated by opening the window, the instruction unit 86 may cause the air conditioner 22 to keep the temperature of the air in the room 16 constant, based on the measurement result by the temperature sensor device 26. For example, when the room 16 is ventilated by opening the window, the instruction unit 86 may cause the air conditioner 22 to keep the humidity of the air in the room 16 constant, based on the measurement result by the humidity sensor device 28. Then, after the room 16 is ventilated by opening the window, the instruction unit 86 terminates ventilation of the room 16 by giving an instruction to the window controller 34 to close the window when the determined intensity of the odor falls below the predetermined second threshold.

Figure 7:
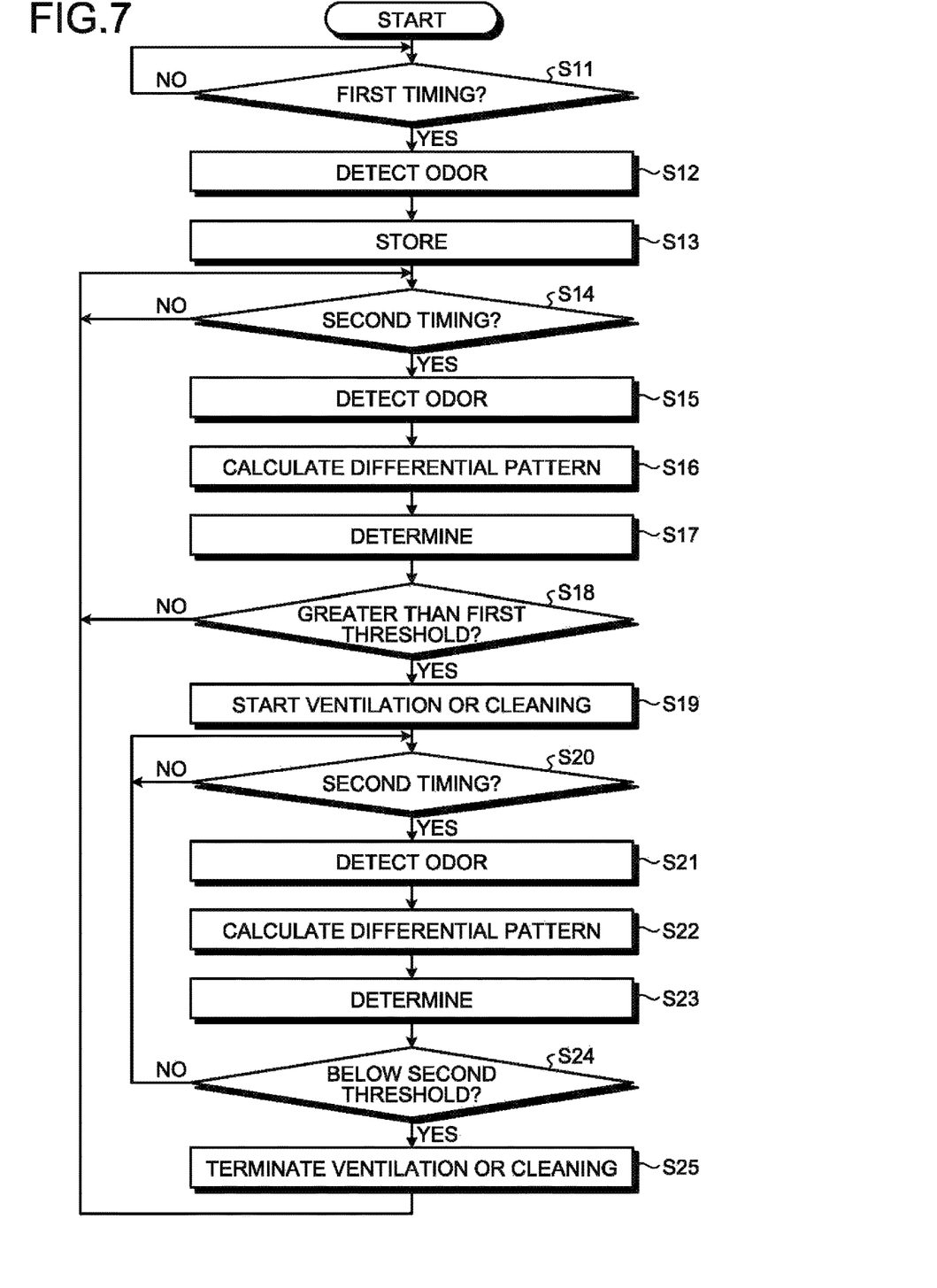
FIG. 7 is a flowchart illustrating an air conditioning control process.

FIG. 7 is a flowchart illustrating an air conditioning control process. The control device 20 executes the processes from step S11 to step S25 illustrated in FIG. 7.

First of all, at step S11, the control device 20 determines whether it is a first timing. If not the first timing (No at S11), the control device 20 waits at the process at step S11. If the first timing (Yes at S11), the control device 20 proceeds to the process at step S12.

At step S12, the control device 20 gives an instruction to the odor sensor device 30 to detect an odor of the air in the room 16. The control device 20 then acquires a signal indicating the detected value of each of at least one detector at the first timing from the odor sensor device 30. Subsequently, at step S13, the control device 20 stores the detected value of each of at least one detector at the first timing.

Subsequently, at step S14, the control device 20 determines whether it is a second timing. The second timing is the timing at predetermined intervals from the first timing. For example, the second timing may be the timing, for example, every few tens of seconds or every few minutes after the first timing.

If not the second timing (No at S14), the control device 20 waits at the process at step S14. If the second timing (Yes at S14), the control device 20 proceeds to the process at step S15.

At step S15, the control device 20 gives an instruction to the odor sensor device 30 to detect an odor of the air in the room 16. The control device 20 then acquires a signal indicating the detected value of each of at least one detector at the second timing from the odor sensor device 30.

Subsequently, at step S16, the control device 20 calculates a differential pattern indicating the difference between a first pattern indicating the detected value of each of at least one detector at the first timing and a second pattern indicating the detected value of each of at least one detector at the second timing. For example, the control device 20 calculates a differential pattern by subtracting the detected value of each of at least one detector that is included in the first pattern from the detected value of the corresponding detector that is included in the second pattern.

Subsequently, at step S17, the control device 20 matches the differential pattern with a plurality of reference patterns stored in advance. The control device 20 then determines the kind of odor and the intensity of the odor of the air in the room 16.

Subsequently, at step S18, the control device 20 determines whether the intensity of the odor of the air in the room 16 is greater than a first threshold. In this case, the control device 20 may determine whether the intensity of a predetermined kind of odor of the air in the room 16 is greater than a first threshold. If the intensity of the odor of the air in the room 16 is equal to or smaller than the first threshold (No at S18), the control device 20 returns to the process at step S14. If the intensity of the odor of the air in the room 16 is greater than the first threshold (Yes at S18), the control device 20 proceeds to the process at step S19.

At step S19, the control device 20 gives an instruction to the air conditioner controller 32 to cause the air conditioner 22 to start ventilation or cleaning of the air in the room 16. In this case, the control device 20 may ventilate the room 16 by giving an instruction to the window controller 34 to open the window. In this case, the control device 20 may cause the air conditioner 22 to keep the temperature of the air in the room 16 constant, based on the measurement result by the temperature sensor device 26. In this case, the control device 20 may cause the air conditioner 22 to keep the humidity of the air in the room 16 constant, based on the measurement result by the humidity sensor device 28.

Subsequently, at step S20, the control device 20 determines whether it is a second timing. If not the second timing (No at S20), the control device 20 waits at the process at step S20. If the second timing (Yes at S20), the control device 20 proceeds to the process at step S21.

At step S21, the control device 20 gives an instruction to the odor sensor device 30 to detect an odor of the air in the room 16. The control device 20 then acquires a signal indicating the detected value of each of at least one detector at the second timing from the odor sensor device 30.

Subsequently, at step S22, the control device 20 calculates a differential pattern indicating the difference between a first pattern indicating the detected value of each of at least one detector at the first timing and a second pattern indicating the detected value of each of at least one detector at the second timing.

Subsequently, at step S23, the control device 20 matches the differential pattern with a plurality of reference patterns stored in advance. The control device 20 then determines the kind of odor and the intensity of the odor of the air in the room 16.

Subsequently, at step S24, the control device 20 determines whether the intensity of the odor of the air in the room 16 falls below a second threshold. If the intensity of the odor of the air in the room 16 is equal to or greater than the second threshold (No at S24), the control device 20 returns to the process at step S20. If the intensity of the odor of the air in the room 16 falls below the second threshold (Yes at S24), the control device 20 proceeds to the process at step S25.

Subsequently, at step S25, the control device 20 gives an instruction to the air conditioner controller 32 to cause the air conditioner 22 to stop ventilation or cleaning of the air in the room 16. If the room 16 has been ventilated by opening the window, the control device 20 gives an instruction to the window controller 34 to close the window.

The control device 20 then terminates the process at step S25 and returns to the process at step S14.

The air conditioning system 10 according to the present embodiment has been described above. Such an air conditioning system 10 according to the present embodiment achieves, for example, the following effects.

The air conditioning system 10 according to the present embodiment operates the air conditioner 22 or opens the window to ventilate or clean the air in the room 16 when the odor is stronger than the intensity of the odor at the first timing (the timing when an unusual smell does not occur) by a threshold or more. Such an air conditioning system 10 can reduce the unusual smell in the room 16 without the driver/passenger operating the air conditioner 22 or operating the window. The air conditioning system 10 thus can reduce the unusual smell in the room 16 with fewer burdens.

First Modification

The air conditioning system 10 according to a first modification will now be described. The air conditioning system 10 according to the first modification has almost the same functions and configuration as the air conditioning system 10 according to an embodiment described with reference to FIG. 1 to FIG. 7, and the blocks with almost the same functions and configuration are denoted by the same reference signs and will not be further elaborated except for the differences. This is applicable to the second and subsequent modifications.

Figure 8:
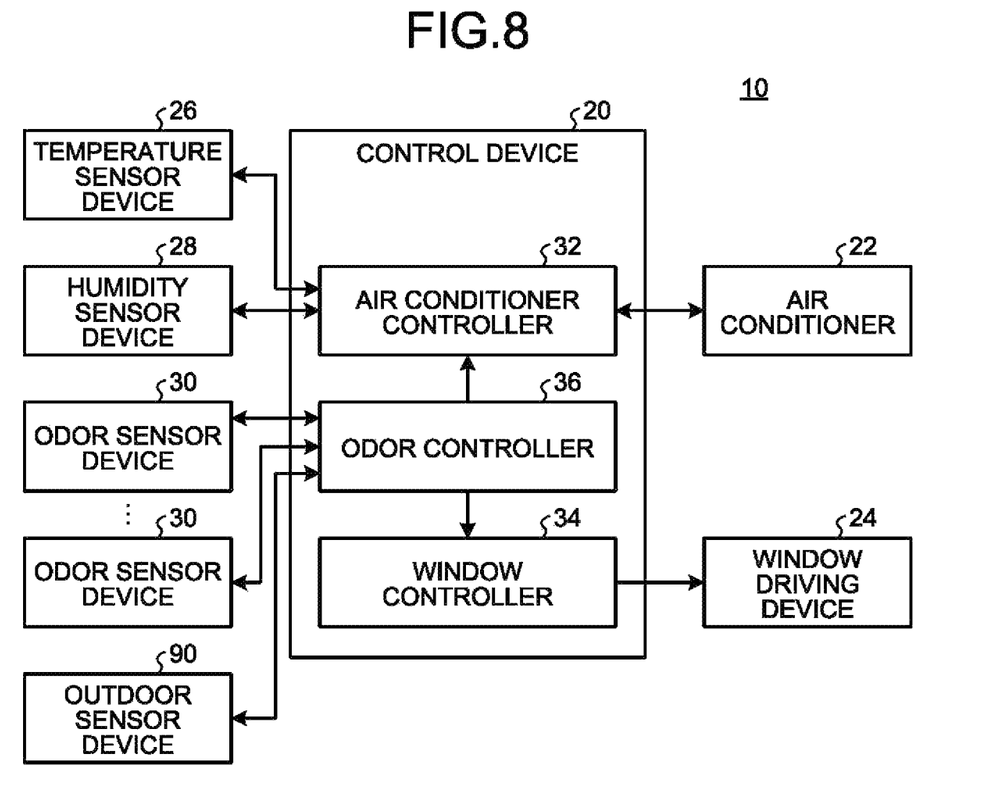
FIG. 8 is a diagram illustrating a configuration of the air conditioning system according to a first modification.

FIG. 8 is a diagram illustrating a configuration of the air conditioning system 10 according to the first modification. The air conditioning system 10 according to the first modification includes a plurality of odor sensor devices 30. The odor sensor devices 30 have the same configuration. The odor sensor devices 30 may be disposed at different locations in the room 16. Each of the odor sensor devices 30 transmits a signal indicating the detected value of each of at least one detector to the control device 20.

The air conditioning system 10 according to the first modification further includes an outdoor sensor device 90. The outdoor sensor device 90 is attached to, for example, a duct for taking in the air from the outside of the room 16 (outside the vehicle 18).

The outdoor sensor device 90 detects the amount of an odor-causing substance included in the air outside the room 16. The outdoor sensor device 90 has the same configuration as the odor sensor device 30. The outdoor sensor device 90 transmits a signal indicating the detected value of each of at least one detector to the control device 20.

Figure 9:
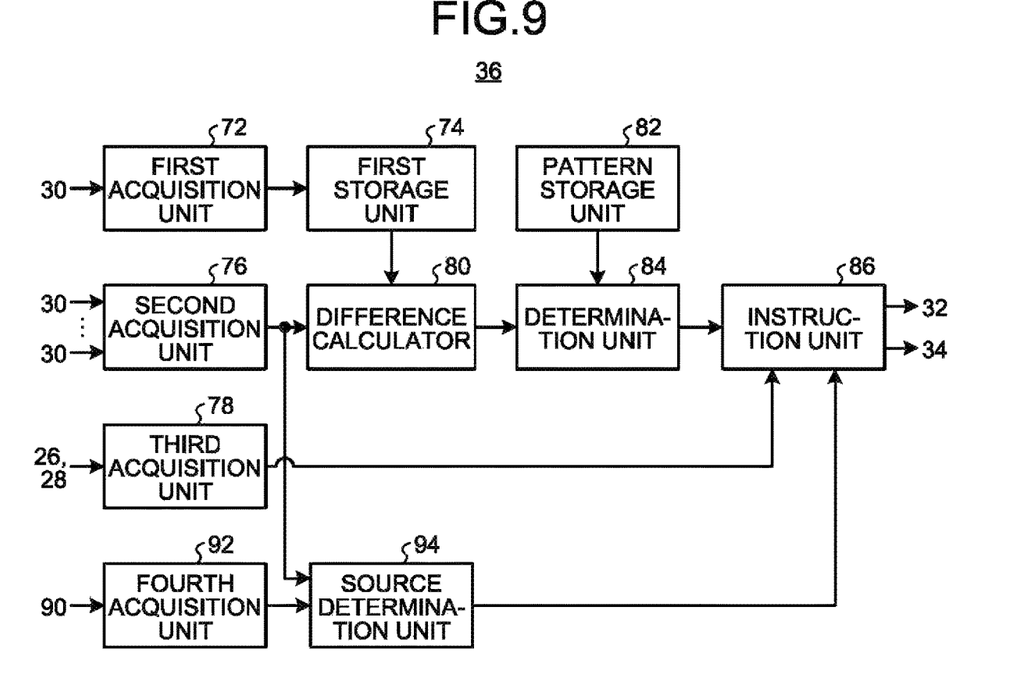
FIG. 9 is a diagram illustrating a functional configuration of the odor controller according to the first modification.

FIG. 9 is a diagram illustrating a functional configuration of the odor controller 36 according to the first modification. The odor controller 36 according to the first modification further includes a fourth acquisition unit 92 and a source determination unit 94.

The fourth acquisition unit 92 gives a detection instruction to the outdoor sensor device 90 at the second timing. The fourth acquisition unit 92 then acquires a signal indicating the detected value of each of at least one detector at the second timing from the outdoor sensor device 90.

The source determination unit 94 identifies whether the source of the odor is inside the room 16 or outside the room 16. Specifically, the source determination unit 94 compares the second pattern indicating the detected value of each of at least one detector included in the odor sensor device 30 at the second timing with a third pattern indicating the detected value of each of at least one detector included in the outdoor sensor device 90 at the second timing. If the second pattern agrees with the third pattern (if the difference is equal to or smaller than a predetermined value), the source determination unit 94 determines that the source of the odor is outside the room 16. If the second pattern does not agree with the third pattern (if the difference is greater than a predetermined value), the source determination unit 94 determines that the source of the odor is inside the room 16.

In the first modification, the instruction unit 86 changes the method of ventilation and cleaning of the air in the room 16, depending on the source of the odor. Specifically, if the source of the odor is outside the room 16, the instruction unit 86 causes the air conditioner 22 to clean the air in the room 16, without taking in the air outside the room 16.

When the source of the odor is inside the room 16, the instruction unit 86 takes in the air outside the room 16 to ventilate the room 16. In this case, the instruction unit 86 may cause the air conditioner 22 to ventilate or may open the window to ventilate. In this case, the instruction unit 86 may perform ventilation while causing the air conditioner 22 to keep the temperature inside the room 16.

The control device 20 according to the first modification cleans the air in the room 16 without ventilation when the source of the odor is outside the room 16 and therefore can efficiently reduce the unusual smell in the room 16.

The second acquisition unit 76 according to the first modification acquires signals indicating the detected value of each of at least one detector from a plurality of odor sensor devices 30. The second acquisition unit 76 obtains the average of the detected value of at least one detector from these signals and outputs the average.

The second acquisition unit 76 may determine, for example, that the odor sensor device 30 that outputs a value different from the average value by a predetermined value or more is failed. The second acquisition unit 76 then may calculate the average value again, excluding the odor sensor device 30 determined to be failed. The control device 20 according to the first modification thus can precisely detect an unusual smell in the room 16.

The odor controller 36 may perform ventilation and cleaning of the air, for each of a plurality of odor sensor devices 30. In this case, the odor controller 36 identifies the position of the odor sensor device 30 with an intensity of an odor greater than a first threshold and opens the window at the corresponding position for ventilation. Such a control device 20 according to the first modification can ventilate the location where an unusual smell occurs.

Second Modification

The air conditioning system 10 according to a second modification will now be described.

Figure 10:
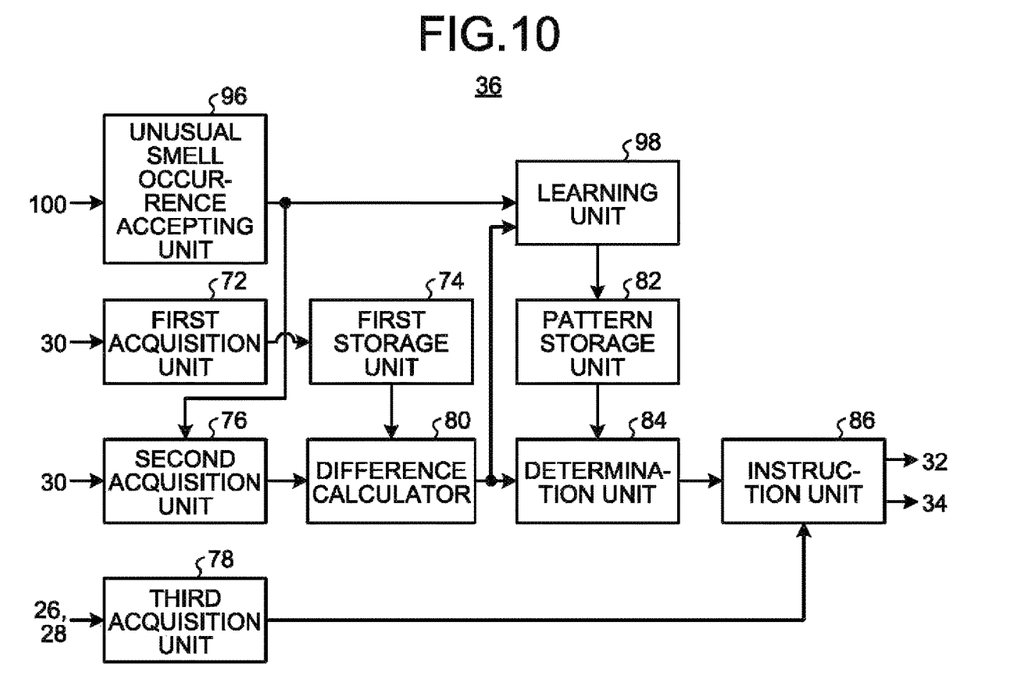
FIG. 10 is a diagram illustrating a functional configuration of the odor controller according to a second modification.
Figure 11:
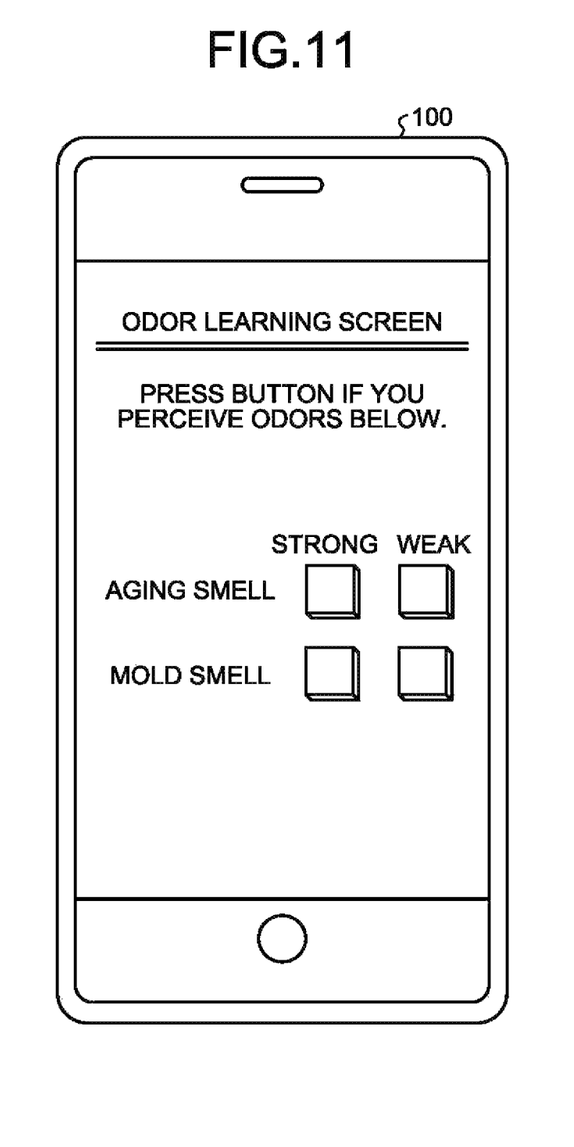
FIG. 11 is a diagram illustrating a display example of an information processing apparatus operating in cooperation with a control device.

FIG. 10 is a diagram illustrating a functional configuration of the odor controller 36 according to the second modification. FIG. 11 is a diagram illustrating a display example of an information processing apparatus 100 operating in cooperation with the control device 20 in the second modification.

The odor controller 36 according to the second modification further includes an unusual smell occurrence accepting unit 96 and a learning unit 98.

The unusual smell occurrence accepting unit 96 accepts an unusual smell occurrence timing when the user perceives that a predetermined kind of odor occurs in the room 16 after the first timing. The unusual smell occurrence accepting unit 96 may further accept the intensity of the odor.

The unusual smell occurrence accepting unit 96 accepts a timing when a predetermined operation is performed on the information processing apparatus 100 operating in cooperation with the control device 20, for example, as illustrated in FIG. 11. In the example in FIG. 11, the unusual smell occurrence accepting unit 96 can detect a timing when the user perceives an aging smell and a timing when the user perceives a mold smell.

Alternatively, the unusual smell occurrence accepting unit 96 may accept an unusual smell occurrence timing by a method other than input to the information processing apparatus 100. For example, the unusual smell occurrence accepting unit 96 may accept the timing when the driver/passenger presses a button provided, for example, at a seat of the vehicle 18, as an unusual smell occurrence timing. The unusual smell occurrence accepting unit 96 may accept an unusual smell occurrence timing by determining the degree of stress from the face of the driver/passenger based on an image captured by an on-vehicle camera or the like. The unusual smell occurrence accepting unit 96 may recognize the voice of the driver/passenger and accept the timing when a voice "it stinks" is produced, as an unusual smell occurrence timing.

Alternatively, the unusual smell occurrence accepting unit 96 may detect, for example, the timing when the driver/passenger performs the operation for ventilation or cleaning of the air, as an unusual smell occurrence timing. For example, the unusual smell occurrence accepting unit 96 may detect, for example, the timing when the driver/passenger opens the window as an unusual smell occurrence timing or may detect the timing when the driver/passenger performs operation for ventilation or cleaning of the air by the air conditioner 22, as an unusual smell occurrence timing.

In the second modification, the second acquisition unit 76 gives an instruction to the odor sensor device 30 to detect an odor of the air in the room 16 when the unusual smell occurrence accepting unit 96 detects an unusual smell occurrence timing. The second acquisition unit 76 then acquires a signal indicating the detected value of each of at least one detector at the unusual smell occurrence timing from the odor sensor device 30.

In the second modification, the difference calculator 80 calculates a differential unusual smell pattern indicating the difference between a first pattern and an unusual smell pattern indicating the detected value of each of at least one detector at an unusual smell occurrence timing. For example, the difference calculator 80 calculates a differential unusual smell pattern by subtracting the first pattern from the unusual smell pattern. For example, the difference calculator 80 subtracts the detected value of each of at least one detector that is included in the first pattern from the detected value of the corresponding detector that is included in the unusual smell pattern. The differential unusual smell pattern thus calculated indicates the detected value of each of at least one detector corresponding to the amount of change in the odor from the first timing to the unusual smell occurrence timing. In the second modification, the difference calculator 80 applies the calculated differential unusual smell pattern to the learning unit 98.

The learning unit 98 corrects a reference pattern stored in the pattern storage unit 82 with the differential unusual smell pattern. For example, the learning unit 98 teaches a reference pattern stored in the pattern storage unit 82, using the differential unusual smell pattern as teaching data. When reference patterns of different kinds of odors and odor intensities are stored in the pattern storage unit 82, the reference pattern corresponding to the kind of odor and the intensity of the odor accepted by the unusual smell occurrence accepting unit 96 is corrected with the differential unusual smell pattern.

Such a control device 20 according to the second modification can correct the reference pattern to data suitable for the environment and therefore can precisely determine an odor of the air in the room 16.

Hardware Configuration of Control Device 20

Figure 12:
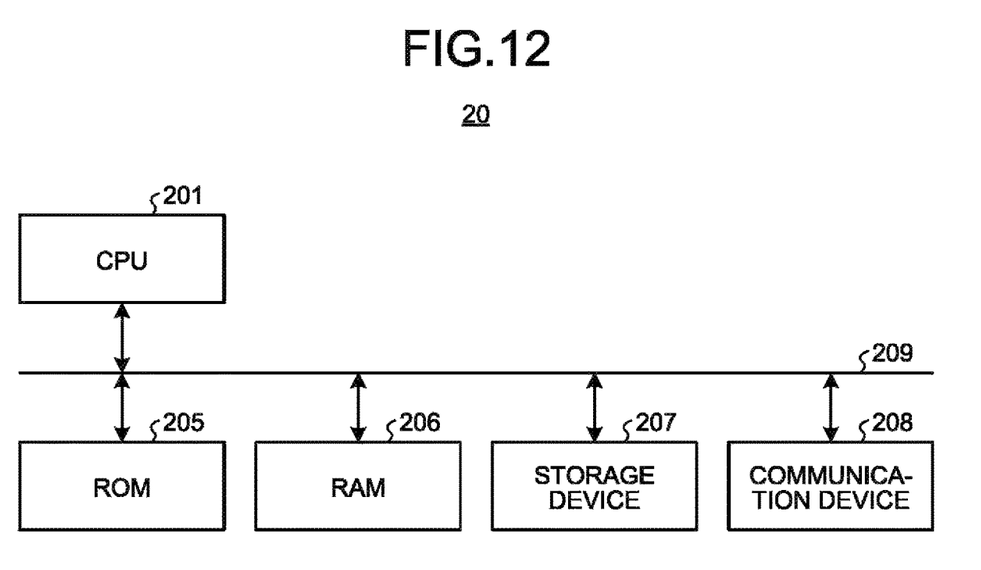
FIG. 12 is a diagram illustrating a hardware configuration of the control device.

FIG. 12 is a diagram illustrating a hardware configuration of the control device 20. The control device 20 is implemented, for example, by a hardware configuration similar to that of a general-purpose computer. The control device 20 includes a central processing unit (CPU) 201, a read only memory (ROM) 205, a random access memory (RAM) 206, a storage device 207, a communication device 208, and a bus 209. The units are connected through the bus 209.

The CPU 201 executes a variety of processing in cooperation with a variety of programs stored in the ROM 205 or the storage device 207 in advance, using a prescribed area in the RAM 206 as a working area, and centrally controls the operation of each unit in the control device 20. The CPU 201 causes the communication device 208 and the like to operate in cooperation with a program stored in the ROM 205 or the storage device 207 in advance.

The ROM 205 stores a program and settings information for use in control of the control device 20 in a non-rewritable manner. The RAM 206 is a volatile storage medium such as a synchronous dynamic random access memory (SDRAM). The RAM 206 functions as a working area of the CPU 201.

The storage device 207 is a rewritable recording device, such as a semiconductor storage medium such as a flash memory or a magnetically or optically recordable storage medium. The storage device 207 stores a program for use in control of the control device 20. The storage device 207 also functions as the first storage unit 74 and the pattern storage unit 82.

The communication device 208 transmits/receives data to/from the odor sensor device 30, the temperature sensor device 26, the humidity sensor device 28, the air conditioner 22, the window driving device 24, and the like.

The program executed in the control device 20 in the present embodiment is, for example, stored on a computer connected to a network such as the Internet and downloaded via the network. Alternatively, the program executed in the control device 20 in the present embodiment may be included in a portable storage medium or the like.

The program executed in the control device 20 in the present embodiment has a module configuration including a first acquisition module, a second acquisition module, a third acquisition module, a difference calculation module, a determination module, and an instruction module. The CPU 201 (processor) reads such a program from a storage medium or the like to load the modules into the RAM 206 (main storage device). The CPU 201 (processor) then executes such a program to function as the first acquisition unit 72, the second acquisition unit 76, the third acquisition unit 78, the difference calculator 80, the determination unit 84, and the instruction unit 86. The first acquisition unit 72, the second acquisition unit 76, the third acquisition unit 78, the difference calculator 80, the determination unit 84, and the instruction unit 86 may be partially or entirely configured with hardware.

An aspect of the present invention can reduce an unusual smell in the room with fewer burdens.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An air conditioning system comprising:
an air conditioner to regulate a state of air in a room;
a sensor device including at least one detector to detect an amount of an odor-causing substance included in the air in the room; and
a control device to control operation of the air conditioner, the control device including:
a first acquisition unit to acquire, from the sensor device, a detected value of each of the at least one detector at a first timing;
a second acquisition unit to acquire, from the sensor device, a detected value of each of the at least one detector at a second timing later than the first timing;
a difference calculator to calculate a difference between the detected value of each of the at least one detector at the first timing and the detected value of each of the at least one detector at the second timing; and
an instruction unit to control operation of the air conditioner based on the difference,
wherein the control device determines whether a person is present in the room, and causes the first acquisition unit to acquire the detected value at the first timing in response to a determination that the person is present in the room.

2. The air conditioning system according to claim 1, wherein
the control device further includes a determination unit to determine an intensity of an odor of the air in the room based on the difference, and
the instruction unit causes the air conditioner to start ventilation or cleaning of the air in the room when the determined intensity of the odor is greater than a predetermined first threshold.

3. The air conditioning system according to claim 2, wherein after ventilation or cleaning of the air in the room by the air conditioner is started, the instruction unit causes the air conditioner to stop ventilation or cleaning of the air in the room when the determined intensity of the odor falls below a predetermined second threshold.

4. The air conditioning system according to claim 2, wherein
the control device further includes a pattern storage unit to store one or more reference patterns in association with different kinds of odors,
each of the reference patterns indicates a detected value of each of the at least one detector indicating an amount of an odor-causing substance included in air having a corresponding odor, and
the determination unit determines an intensity of an odor by matching a differential pattern with the reference patterns, the differential pattern indicating a difference between the detected value of each of the at least one detector at the first timing and the detected value of each of the at least one detector at the second timing.

5. The air conditioning system according to claim 4, wherein
the second acquisition unit acquires, from the sensor device, a detected value of each of the at least one detector at an unusual smell occurrence timing when a user perceives that a predetermined kind of odor occurs in the room after the first timing, and
the control device further includes a learning unit to correct the reference pattern based on a difference between the detected value of each of the at least one detector at the first timing and the detected value of each of the at least one detector at the unusual smell occurrence timing.

6. The air conditioning system according to claim 2, further comprising a temperature sensor device to measure temperature of the air in the room, wherein
the control device further includes a third acquisition unit to acquire a measurement result of temperature of the air from the temperature sensor device, and
the instruction unit causes the air conditioner to ventilate the room while keeping temperature of the air in the room constant, based on the measurement result by the temperature sensor device.

7. The air conditioning system according to claim 6, further comprising an outdoor sensor device including at least one detector to detect an amount of an odor-causing substance included in air outside the room, wherein
the control device further includes:
a fourth acquisition unit to acquire, from the outdoor sensor device, a detected value of each of the at least one detector included in the outdoor sensor device at the second timing; and
a source determination unit to determine whether a source of the odor is inside the room or outside the room by comparing the detected value of each of the at least one detector included in the outdoor sensor device at the second timing with the detected value of each of the at least one detector included in the sensor device at the second timing, and the instruction unit
causes the air conditioner to clean the air in the room without taking in the air outside the room when the source of the odor is outside the room, and
ventilates the room by taking in the air outside the room when the source of the odor is inside the room.

8. A vehicle comprising the air conditioning system according to claim 1, wherein
the room is inside the vehicle.

9. A control device to control an air conditioner to regulate a state of air in a room, the control device comprising:
a first acquisition unit to acquire, from a sensor device including at least one detector to detect an amount of an odor-causing substance included in the air in the room, a detected value of each of the at least one detector at a first timing;
a second acquisition unit to acquire, from the sensor device, a detected value of each of the at least one detector at a second timing later than the first timing;
a difference calculator to calculate a difference between the detected value of each of the at least one detector at the first timing and the detected value of each of the at least one detector at the second timing; and
an instruction unit to control operation of the air conditioner based on the difference,
wherein the control device determines whether a person is present in the room, and causes the first acquisition unit to acquire the detected value at the first timing in response to a determination that the person is present in the room.

10. A control method of controlling an air conditioner to regulate a state of air in a room, the method comprising:
determining whether a person is present in the room;
acquiring, from a sensor device including at least one detector to detect an amount of an odor-causing substance included in the air in the room, a detected value of each of the at least one detector at a first timing in response to a determination that the person is present in the room;

acquiring, from the sensor device, a detected value of each of the at least one detector at a second timing later than the first timing;

calculating a difference between the detected value of each of the at least one detector at the first timing and the detected value of each of the at least one detector at the second timing; and controlling operation of the air conditioner based on the difference.

11. An air conditioning system comprising:

an air conditioner to regulate a state of air in a room;

a sensor device including at least one detector to detect an amount of an odor-causing substance included in the air in the room; and a control device to control operation of the air conditioner, the control device including:
- a first acquisition unit to acquire, from the sensor device, a detected value of each of the at least one detector at a first timing when a person is present in the room;
- a second acquisition unit to acquire, from the sensor device, a detected value of each of the at least one detector at a second timing later than the first timing;
- a difference calculator to calculate a difference between the detected value of each of the at least one detector at the first timing and the detected value of each of the at least one detector at the second timing;
- an instruction unit to control operation of the air conditioner based on the difference;
- a determination unit to determine an intensity of an odor of the air in the room based on the difference; and
- a pattern storage unit to store one or more reference patterns in association with different kinds of odors, wherein the instruction unit causes the air conditioner to start ventilation or cleaning of the air in the room when the determined intensity of the odor is greater than a predetermined first threshold, each of the reference patterns indicates a detected value of each of the at least one detector indicating an amount of an odor-causing substance included in air having a corresponding odor, and the determination unit determines an intensity of an odor by matching a differential pattern with the reference patterns, the differential pattern indicating a difference between the detected value of each of the at least one detector at the first timing and the detected value of each of the at least one detector at the second timing.

12. A control device to control an air conditioner to regulate a state of air in a room, the control device comprising:

a first acquisition unit to acquire, from a sensor device including at least one detector to detect an amount of an odor-causing substance included in the air in the room, a detected value of each of the at least one detector at a first timing when a person is present in the room;

a second acquisition unit to acquire, from the sensor device, a detected value of each of the at least one detector at a second timing later than the first timing;

a difference calculator to calculate a difference between the detected value of each of the at least one detector at the first timing and the detected value of each of the at least one detector at the second timing;

an instruction unit to control operation of the air conditioner based on the difference;

a determination unit to determine an intensity of an odor of the air in the room based on the difference; and a pattern storage unit to store one or more reference patterns in association with different kinds of odors, wherein the instruction unit causes the air conditioner to start ventilation or cleaning of the air in the room when the determined intensity of the odor is greater than a predetermined first threshold, each of the reference patterns indicates a detected value of each of the at least one detector indicating an amount of an odor-causing substance included in air having a corresponding odor, and the determination unit determines an intensity of an odor by matching a differential pattern with the reference patterns, the differential pattern indicating a difference between the detected value of each of the at least one detector at the first timing and the detected value of each of the at least one detector at the second timing.

13. A control method of controlling an air conditioner to regulate a state of air in a room, the method comprising:

acquiring, from a sensor device including at least one detector to detect an amount of an odor-causing substance included in the air in the room, a detected value of each of the at least one detector at a first timing when a person is present in the room;

acquiring, from the sensor device, a detected value of each of the at least one detector at a second timing later than the first timing;

calculating a difference between the detected value of each of the at least one detector at the first timing and the detected value of each of the at least one detector at the second timing;

controlling operation of the air conditioner based on the difference;

determining an intensity of an odor of the air in the room based on the difference; and storing one or more reference patterns in association with different kinds of odors, wherein the controlling includes causing the air conditioner to start ventilation or cleaning of the air in the room when the determined intensity of the odor is greater than a predetermined first threshold, each of the reference patterns indicates a detected value of each of the at least one detector indicating an amount of an odor-causing substance included in air having a corresponding odor, and the determining includes determining an intensity of an odor by matching a differential pattern with the reference patterns, the differential pattern indicating a difference between the detected value of each of the at least one detector at the first timing and the detected value of each of the at least one detector at the second timing.

* * * * *